Shota Miyairi
Yuzuru Tsunehiro
Noriaki Sato
INVENTORS

BY George B. Oujevolk
Attorney

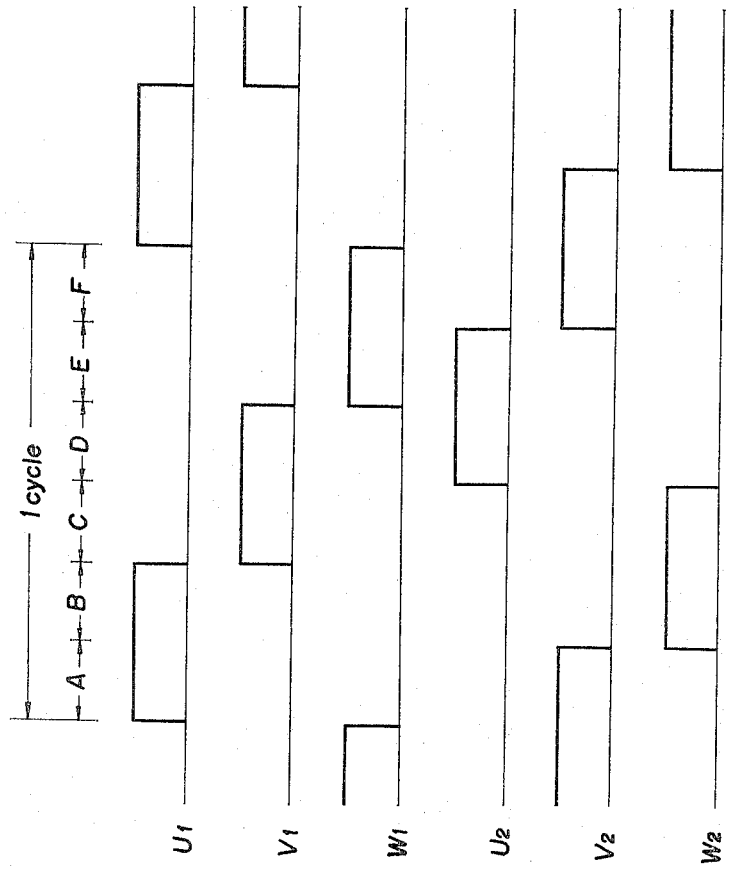

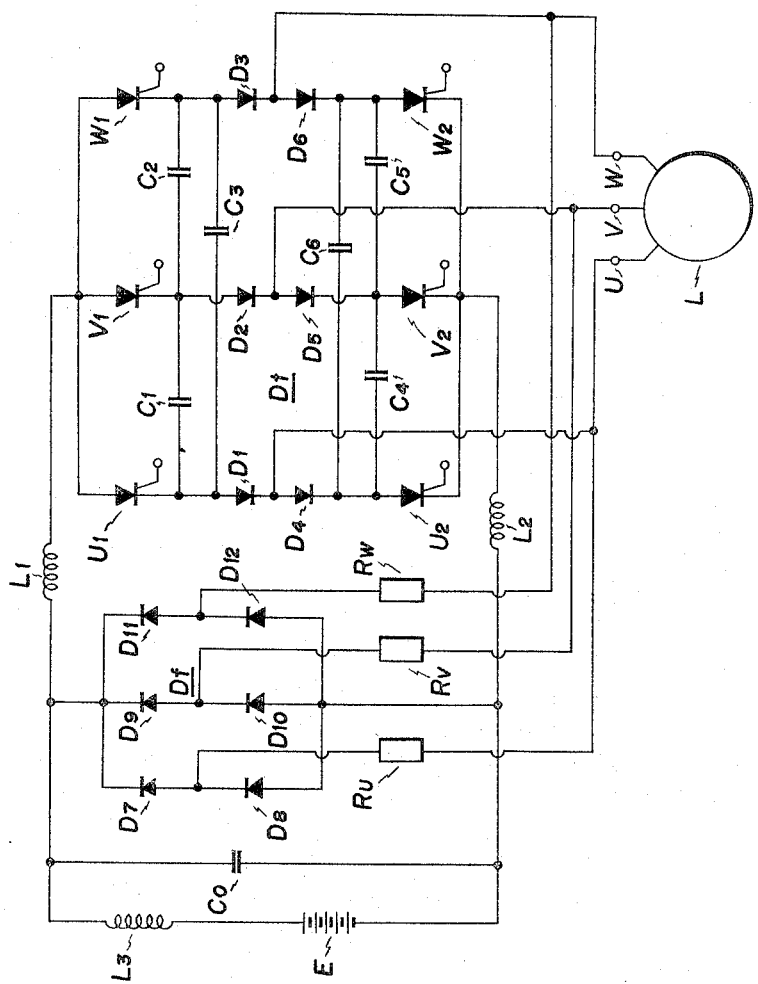

United States Patent Office 3,336,520
Patented Aug. 15, 1967

3,336,520
D.C. TO POLYPHASE INVERTER WITH FEED-
BACK LOOP FOR REACTANCE CURRENT
OF INDUCTIVE LOAD
Shota Miyairi, Yuzuru Tsunehiro, and Noriaki Sato, all of Tokyo, Japan, assignors of one-half to Tokyo Shibaura Electric Co., Ltd., Kawasaki-shi, Japan, a corporation of Japan, and one-half to Shota Miyairi, Tokyo, Japan
Filed Dec. 12, 1963, Ser. No. 330,156
Claims priority, application Japan, Dec. 17, 1962, 37/55,381
2 Claims. (Cl. 321—5)

ABSTRACT OF THE DISCLOSURE

An SCR and diode first bridge having a number of parallel branches corresponding to the number of phases converts the input from a DC source to a polyphase output. Capacitors are connected between the branches, and, the reactance current component created by an inductive load is fed back to a second bridge in parallel with the first bridge. This second bridge includes diodes disposed in a polarity opposite to those of the first bridge and inductive balancing load elements. Feedback is to the junction point of the diodes in the second bridge.

---

This invention relates to an improved polyphase inverter apparatus and more particularly to a new inverter apparatus including a novel means for improving the commutation characteristics thereof so as to be operable with inductive load, or under variable frequency condition.

Recent development of large capacity semiconductor controlled rectifier elements, such as silicon controlled rectifier elements (for brevity, hereinafter will be designated as SCR elements) is remarkable. As the SCR elements are characterized by their long operating life, high reliability, rapid response, small size, light weight, contactless and many other advantages they are used in many applications including three phase inverters, for example, and demand for three phase variable frequency inverters is increasing in order to effect speed control of constant speed motors such as synchronous motors and induction motors wherein advantage of substantially smaller deionization time of the SCR elements than the conventional grid controlled electric valves is fully utilized.

While there have been proposed many types of inverters such as parallel type, series type and series parallel type, most of them utilize condenser or condensers as the commutating means between SCR elements which are connected to conduct alternately, and their gate electrodes are energized by variable frequency gate signals in order to supply a variable frequency alternating current to the load. It is well known in the art that there is no trouble when the load of the inverter is resistive, but there are many troubles when the load is inductive or the power factor of the load varies substantially, as in the case where the load is constituted by synchronous motors and induction motors. More particularly variation of the output voltage of the inverter due to variation in load or frequency is large so that unsatisfactory commutation will be resulted unless the capacity of the commutating condenser is increased with the increase in the load, especially the inductive load. Moreover, it is necessary to vary the capacity of the commutating condenser in response to the operating frequency of the inverter in order to assure the stability and efficiency of the inverter. In order to obviate various difficulties mentioned above there have been proposed various devices, but they are not satisfactory in that they require very complicated and high price devices. However it is highly desirable to solve these problems as fast as possible in view of exhaustive research in developing a novel system of speed control of alternating current motors, that is the so-called commutatorless motors over a wide range with variable frequency source.

Accordingly it is the principal object of this invention to provide a novel polyphase inverter which can operate satisfactory even with an inductive load or under variable frequency condition.

A further object of this invention is to provide a novel polyphase inverter wherein its commutating condenser is not required to be varied when the load and/or frequency varies.

A still further object of this invention is to provide an improved polyphase inverter which can provide regenerative braking for alternating current load motors.

Briefly, in accordance with this invention there is provided a polyphase inverter comprising a bridge connected electric valve converting device including a plurality of parallel branches connected across a direct current source. Each of said parallel branches includes a pair of controlled rectifier elements and a rectifier group consisting of a pair of serially connected diodes connected in series between said controlled rectifier elements and the common junction between said diodes of each of said branches is connected to one of the terminals of a polyphase load. Suitable means is provided to apply control signals to the control electrodes of the controlled rectifier elements to control the conduction thereof in a manner well known in the art. Between common junctions between each of said controlled rectifier elements and each of the diodes belonging to adjacent branches is connected to a commutating condenser. A second rectifier group is connected between the DC source and the electric valve converting device in parallel therewith through a suitable impedance means such as a resistance or an inductance, said second rectifier group comprising a plurality of branches connected in parallel across said source of direct current and including a pair of serially connected diodes which are oppositely poled with respect to said controlled rectifier elements and said first mentioned rectifier group, said second rectifier group serving to return the reactive current component of the load to the source. The common junctions between diodes of said second rectifier group are connected to the terminals leading to the load and a capacitor is connected across said DC source.

The features of the invention which are believed to be novel are set forth with particularity in the appended claims. The invention itself, however, both as to its organization and method of operation, together with further objects and advantages thereof, may best be understood by reference to the following description taken in connection with the accompanying drawings, in which:

FIG. 4 shows wave forms helpful in understanding the operation of the inverter shown in FIG. 3; and FIG. 5 shows the connection diagram of another embodiment of this invention.

Figure 1:
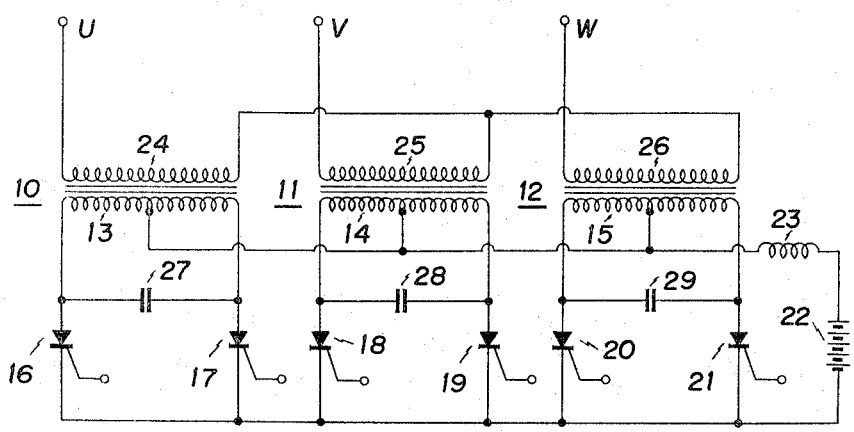
FIGS. 1 and 2 illustrate connection diagrams of two types of prior three phase inverter apparatus.

Referring now to FIG. 1 illustrating the connection diagram of one form of the prior three phase inverter, there is shown an inverter comprising a three phase transformer device including three single phase transformers 10, 11 and 12. The opposite terminals of the primary windings 13, 14 and 15 are respectively connected to the negative side of a suitable source of direct current 22, shown as a battery, through SCR elements 16, 17, 18, 19, 20 and 21 which are poled as shown in the drawing, while the mid-taps of these primary windings are connected to the positive side of said DC source through a smoothing reactor 23. The secondary windings 24, 25 and 26 of the transformer are connected in star and each of the commutating condensers 27, 28 and 29 is connected in parallel with each of the primary windings, thus forming three single phase parallel type inverters. When suitable gate or control signals are applied to the gate electrodes of the SCR elements in a predetermined sequence in a manner well known in the art, the SCR elements will become conductive in a predetermined sequence to provide three-phase alternating current across output terminals U, V and W. For instance, taking the transformer 10 as an example, if a gate signal is applied to the gate electrode of the SCR element 16, current will flow from the positive side of the DC source 22 through the reactor 23, left hand half of the primary winding 13, and the SCR element 16 to the negative side of the DC source to charge the condenser 27. When the gate signal is removed from the SCR element 16 and instead applied to the SCR element 17 the current from the DC source will be commutated from the SCR element 16 to the SCR element 17 since the discharge current of the condenser 27 flows through the SCR element 16 in the direction opposite to its normal direction of conduction. Thus, the direction of current flow through the primary winding 13 will be reversed to induce a half cycle of opposite polarity in the secondary winding 24. As described above, the three phase inverter shown in FIG. 3 is comprised by three such single phase inverters.

Figure 2:
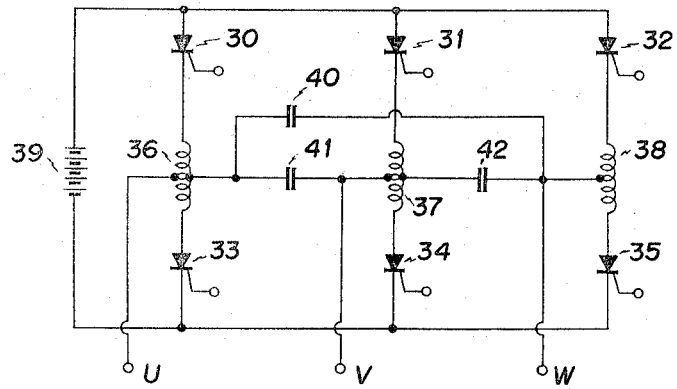
Figure 3:
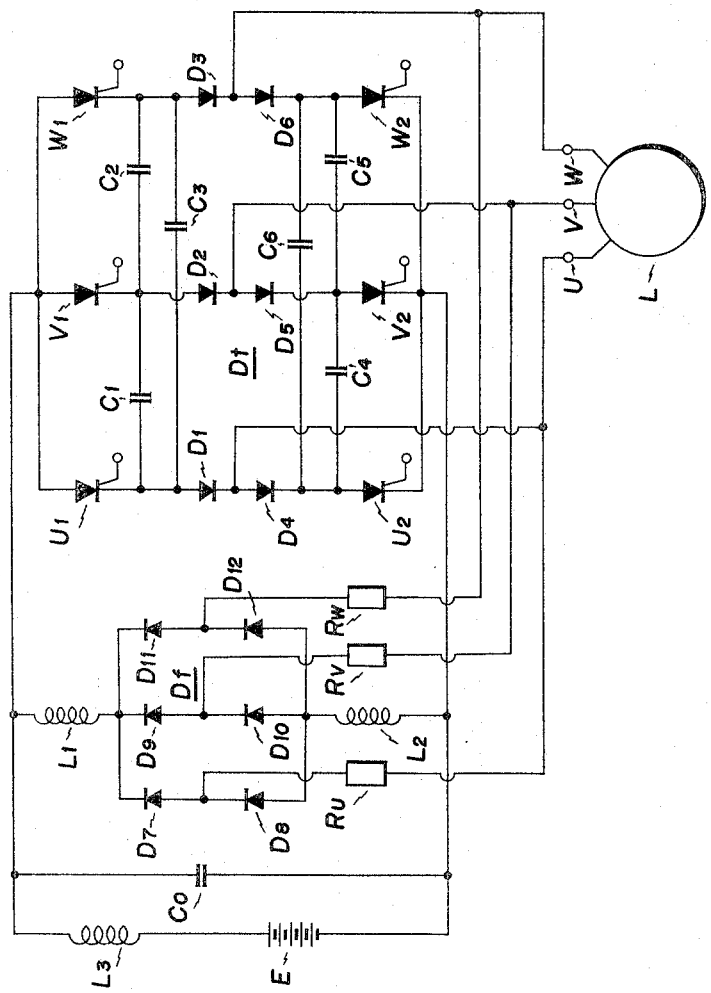
FIG. 3 shows the connection diagram of a three phase inverter embodying the principle of this invention.

In some case a circuit shown in FIG. 2 is utilized as a three phase inverter instead of the circuit shown in FIG. 3. Thus, pairs of SCR elements 30, 33; 31, 34 and 32, 35, having the polarity as shown, are connected in series with reactors 36, 37 and 38, respectively, with their anodes commonly connected to the positive side of a DC source 39 and their cathodes to the negative side of the same source. Between mid taps of the reactors are connected commutating condensers 40, 41 and 42. The principle of operation of the three phase inverter shown in FIG. 2 is identical with that of the single phase inverter but in the former case the cyclic order of conduction of the various SCR elements is 30, 34; 31, 35 and 32, 33. Thus, three phase alternating current may be derived out from terminals U, V and W which are respectively connected to the mid-taps of the reactors 36, 37 and 38.

As already stated hereinabove while there are many types of three phase or polyphase inverters other than those illustrated in FIGS. 1 and 2 the most serious problem common to all of them is to improve their operating characteristics under inductive load. We have solved the problem in the following manner.

Referring now to FIG. 3 of the accompanying drawing which shows the conection diagram of a preferred embodiment of this invention, the three phase inverter shown therein comprises a first branch for the phase U including an SCR element $U_1$, a rectifier group including two diodes $D_1$ and $D_4$ and an SCR element $U_2$, all connected in series with the same polarity in the order mentioned. Similarly the branches for the V and W phases include SCR elements $V_1$, $V_2$, $W_1$ and $W_2$ and rectifier groups comprising diodes $D_2$, $D_5$; $D_3$ and $D_6$. These branches are connected in parallel across a suitable DC source E through an inductance $L_3$. Commutating condensers $C_1$, $C_2$ and $C_3$ are connected as shown across common junctions between SCR elements $U_1$, $V_1$ and $W_1$, and diodes $D_1$, $D_2$ and $D_3$, respectively. Another set of commutating condensers $C_4$, $C_5$ and $C_6$ is similarly connected across junctions between SCR elements $U_2$, $V_2$ and $W_2$, and diodes $D_4$, $D_5$ and $D_6$, respectively. Common junctions between diodes $D_1$ and $D_4$, $D_2$ and $D_5$ and $D_3$ and $D_6$ are connected to the output terminals U, V and W to energize any suitable polyphase load such as an induction motor L.

In accordance with this invention a series circuit comprising reactors $L_1$ and $L_2$ and a rectifier group $Df$ is connected across the DC source E. Also a condenser $C_0$ is connected across the DC source. The rectifier group $Df$ comprises three parallel connected branches each including serially connected diode pairs $D_7$, $D_8$; $D_9$, $D_{10}$ and $D_{11}$, $D_{12}$, respectively, which are poled oppositely to the said rectifier groups comprising the inverter. Common junctions between these diode pairs $D_7$, $D_8$; $D_9$, $D_{10}$ and $D_{11}$, $D_{12}$ are respectively connected to the output terminals U, V and W through resistors $Ru$, $Rv$ and $Rw$. While the source of gate signals for controlling the SCR elements of the inverter is not shown in the drawing, in case when the load L is inductive such as an induction motor it is preferable to use an independent oscillator such as a ring counter as said source of the gate signals whereas to use signals generated by a light source mounted on a motor and a phototransistor device where the load is an AC commutator motor. In any case the gate signals impressed upon the gate electrode of the SCR elements should have a phase relationship as shown in FIG. 4.

The operation of the inverter apparatus shown in FIG. 3 will now be described with reference to FIG. 4. As already mentioned the gate electrodes of the SCR elements are supplied with gate signals represented by various curves shown in FIG. 4. In the interval A, gate signals are applied to only two SCR elements $U_1$ and $V_2$, thus rendering them conductive. Current will then flow from the positive terminal of the DC source E through the inductor $L_3$, SCR element $U_1$, diode $D_1$ and the terminal U to the load. The current will then return to the negative terminal of the DC source from the load terminal V through the diode $D_5$ and the SCR element $V_2$. During this interval A commutating condensers $C_1$ and $C_4$ will be charged by the DC source. During the next interval B, gate signals will be applied to the SCR elements $U_1$ and $W_2$ whereas the gate signal of the SCR element $V_2$ will become zero. The SCR element $V_2$ tends to continue conduction even after its gate electrode has been brought to zero or negative potential as long as its anode voltage is positive, but owing to conduction of the SCR element $W_2$, the SCR element $V_2$ will be rendered non-conductive by the commutating current or discharge current supplied by the commutating condenser $C_5$. As a result during the interval B SCR elements $U_1$ and $W_2$ will be conductive and the load current will flow from the positive terminal of the DC source E through the reactor $L_3$, SCR element $U_1$, diode $D_1$, terminal U, load L, terminal W, and diode $D_6$, SCR element $W_2$ to the negative terminal of the DC source. In this case commutating condensers $C_3$ and $C_6$ are charged. Similarly during succeeding intervals C, D, E and F, SCR element pairs $V_1$, $W_2$; $V_1$, $U_2$; $W_1$, $U_2$ and $W_1$, $V_2$, respectively, will become conductive in a well known manner, thus providing three phase full wave inverting operation.

Features of the improvement according to this invention as applied to FIG. 3 in order to eliminate disadvantages of the prior art reside in the provision of rectifier group $Dt$ such as diodes, $D_1$ to $D_6$ which are respectively included in series of the respective SCR elements and division of commutating condensers into two groups among SCR elements and rectifier group $Dt$. With inductive load the electromagnetic energy stored in the inductance of the load has a tendency to flow through the commutating condensers in a direction to cause them to discharge so as to decrease their terminal voltage to decrease electric energy available to effect commutation between SCR elements. However, rectifier group $Dt$ provided in accordance with this invention serves to prevent the electrical charge stored in the commutating condensers from discharging through the load during intervals during which corresponding SCR elements are maintained non-conductive. In addition the circuit is arranged such that current is supplied from the load to charge the commutating condensers to increase the voltage available for effective commutation. As a result the capacity of the commutating condensers may be made small sufficient to effect commutation between SCR elements. Stated in another way all of the charge stored in the commutating condensers is utilized solely for the purpose of commutation, thus assuring accurate and effective commutation. Moreover, the necessary capacity of the condenser and the cost of installation can be decreased while at the same time the efficiency of the inverter apparatus can be increased. Referring again to FIG. 2, during an interval when SCR elements 30 and 33, for example, are non-conductive, the commutating condenser 41 will discharge through the inductive load connected across terminals U and V thus causing defective commutation. Whereas with the arrangement shown in FIG. 3, during the interval in which the SCR element $V_1$ is maintained non-conductive the rectifier $D_1$ or $D_2$ prevents the commutating condenser $C_1$ from discharging through the load.

Another feature of this invention resides in the provision of a second rectifier group $Df$ including diodes $D_7$ to $D_{12}$ inclusive which is connected across the DC source in series with the reactors $L_1$ and $L_2$. This rectifier group functions to feed back the reactive current component to the source, which remains after the energy stored in the inductance of the load has charged the commutating condenser of one phase after completing commutation of an SCR element of the corresponding phase. Thus, the rectifier group $Df$ compensates for leading as well as lagging power factor so that the capacity of the commutating condensers can be reduced and it is not required to vary it depending upon the power factor of the load as has been the practice in the conventional inverters. Moreover, the tendency of increasing the output voltage or the load voltage above the source voltage caused by the resonance of the load inductance and the capacitance of the condenser can be positively prevented so that even when the output voltage may became higher than source voltage such high output voltage is short circuited by the rectifier group to maintain constant the output voltage, thus preventing excess voltage from being impressed across various SCR elements. Further when the load is constituted by a commutatorless motor utilizing a synchronous motor, the rectifier group $Df$ provides regenerative braking of the motor. Reactors $L_1$ and $L_2$ function to prevent rapid discharge of the commutating condenser through the rectifier group $Df$ after completion of commutation thereby stabilizing the turn off action of the SCR elements.

Condenser $C_0$ which is connected across the DC source acts to quickly charge a commutating condenser which corresponds to a particular SCR element which was rendered conductive at the time of commutation to a voltage about twice higher than the voltage of the DC source thus improving the stability of the inverter operation. For instance, upon commutation from the SCR element $V_2$ to SCR element $W_2$, since the SCR $U_1$ becomes non-conductive, commutating condensers $C_3$ and $C_6$ connected across W and U phases to which SCR elements $W_2$ and $U_1$ are connected will be charged instantly through the SCR element $U_1$. Further, the commutating condenser for the SCR element $V_1$ which is rendered conductive subsequently will be charged up to a voltage which is about twice of the voltage of the DC source. If the load is resistive, this commutating condenser which has been charged to higher voltage cooperate with the rectifier group $Dt$ to enable to reduce the capacitance of the commutating condensers, typically to about ⅔ of that required for prior inverters. This feature is the particular one for polyphase inverters provided with the recifier group $Dt$, and can not be found in single phase inverters.

It will be understood to those in the art that reactors $L_1$ and $L_2$ of FIG. 3 can be replaced by suitable current limiting resistors.

In the modification shown in FIG. 5 reactors $L_1$ and $L_2$ are included in the DC conductors interconnecting the rectifier groups $Df$ and $Dt$. In this case reactors $L_1$ and $L_2$ function to prevent the electric charge of the commutating condensers $C_1$ through $C_6$ from discharging through rectifier groups $Df$ in a manner similar to that described in connection with FIG. 3, and also to limit the current which charges commutating condensers $C_1$ through $C_6$ whereby to improve the stability of inverter operation.

Test results showed that a commutatorless electric motor utilizing the inverter apparatus shown in FIG. 3 can be operated with an output of about 2 kilowatts by utilizing SCR elements of 16 amperes capacity each. Further an induction motor of 2 HP rating was satisfactorily operated in a speed range of 100 to 3800 r.p.m. On the other hand with conventional three phase inverter apparatus it was able to operate the motor only in the speed range of 600 to 1200 r.p.m. under the same condition.

While in the foregoing descriptions, SCR elements have been utilized, this invention can equally be applied to polyphase inverters utilizing such grid controlled electric valves as mercury rectifiers, thyratrons, ignitrons and the like.

Thus, in accordance with this invention by unique combination of semiconductor controlled elements or controlled electric valves and rectifier groups $Dt$ and $Df$, improved polyphase inverters can be provided wherein unstable commutating zone normally present in conventional polyphase inverters is removed, necessity of adjusting commutating condensers in response to the variation in the load and/or frequency is eliminated regenerative braking of the load motor is possible.

While the invention has been described by describing particular embodiments thereof, it will be understood that improvements and modifications may be made without departing from the scope of the invention as defined in the appended claims.

We claim:

1. A polyphase inverter apparatus for converting a direct current from a source to a polyphase alternating current for an inductive load, comprising in combination, a bridge connected electric valve converting device, including a plurality of parallel branches, each having controlled electric valves at each branch ends thereof, at least two rectifiers in each branch connected in series by a first junction and connected to said controlled electric valves by second and third junctions, said first junctions being connected to said alternating current load; means to apply control signals to the control element of said controlled electric valves, a plurality of commutating condensers, each connected between said second junctions in adjacent branches and said third junctions in adjacent branches, a rectifier group connected between said direct current source and said alternating current load in parallel with said electric valve converting device to return the reactive current component of said load to said source, impedance means connected in series with said second rectifier group, and a condenser connected in parallel with said DC source.

2. A polyphase inverter apparatus for converting a direct current from a source to a polyphase alternating current for an inductive load, comprising in combination, a bridge connected electric valve converting device including a number of parallel branches, said number being at least three, connected across said direct current source, each of said branches having a pair of semiconductor controlled rectifier elements and a first rectifier group including a pair of diodes connected by a diode junction and connected in series to said semiconductor controlled rectifier elements by second and third junctions said diode junctions of each of said branches being connected to one of the terminals of said polyphase alternating current inductive load; means to apply control signals to the gate electrode of said semiconductor controlled rectifier elements, a plurality of commutating condensers each connected across the respective second junctions and respective third junctions of adjacent branches, a second rectifier group connected between said direct current source and said electric valve converting device in parallel therewith, said second rectifier group comprising a number of branches corresponding to the first mentioned number of branches, connected in parallel across said source of direct current and including a pair of diodes connected by second diode junctions which are oppositely poled with respect to said semiconductor rectifier elements and said first rectifier group, impedance means connected in series with said second rectifier group, and a condenser connected in parallel with said DC source, said second diode junction of each of the branches of said second rectifier group being connected to said alternating current load.

References Cited

UNITED STATES PATENTS

| | | | |
|---|---|---|---|
| 3,213,287 | 10/1965 | King | 321—45 X |
| 3,219,905 | 11/1965 | Davis et al. | 321—8 |
| 3,229,179 | 1/1966 | Hetzel | 318—138 |
| 3,243,729 | 3/1966 | Olson et al. | |
| 3,250,978 | 5/1966 | Moscardi. | |
| 3,262,036 | 5/1966 | Clarke et al. | 318—231 X |

FOREIGN PATENTS

| | | |
|---|---|---|
| 969,878 | 9/1964 | Great Britain. |

JOHN F. COUCH, *Primary Examiner.*

W. M. SHOOP, *Assistant Examiner.*